(12) United States Patent
Cavaliere et al.

(10) Patent No.: US 11,245,475 B2
(45) Date of Patent: Feb. 8, 2022

(54) OPTICAL SYSTEM AND METHOD FOR SEEDING AN OPTICAL TRANSMITTER

(71) Applicant: Telefonaktiebolaget LM Ericsson (publ), Stockholm (SE)

(72) Inventors: Fabio Cavaliere, Pisa (IT); Marco Presi, Pisa (IT); Ernesto Ciaramella, Pisa (IT)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/963,552

(22) PCT Filed: Jan. 30, 2018

(86) PCT No.: PCT/EP2018/052276
§ 371 (c)(1),
(2) Date: Jul. 21, 2020

(87) PCT Pub. No.: WO2019/149342
PCT Pub. Date: Aug. 8, 2019

(65) Prior Publication Data
US 2020/0358533 A1 Nov. 12, 2020

(51) Int. Cl.
*H04B 10/572* (2013.01)
*H04B 10/2543* (2013.01)
(Continued)

(52) U.S. Cl.
CPC ....... *H04B 10/572* (2013.01); *H04B 10/2543* (2013.01); *H04B 10/40* (2013.01);
(Continued)

(58) Field of Classification Search
None
See application file for complete search history.

(56) References Cited

U.S. PATENT DOCUMENTS

2016/0204876 A1* 7/2016 Kamura ............... H04J 14/0227
398/34

FOREIGN PATENT DOCUMENTS

WO 2012034604 A1 3/2012

OTHER PUBLICATIONS

Saliou et al., "125-km Long Cavity Based on Self-Seeded RSOAs Colorless Sources for 2.5-GB/s DWDM Networks", Apr. 15, 2015, Journal of Lightwave Technology, vol. 33, No. 8, pp. 1602-1607 (Year: 2015).*

(Continued)

*Primary Examiner* — David W Lambert
(74) *Attorney, Agent, or Firm* — Sage Patent Group

(57) ABSTRACT

An optical system and method for seeding an optical transmitter includes a first optical transmitter comprising a first reflective optical amplifier and a second optical transmitter comprising a second reflective optical amplifier. The second optical transmitter is optically coupled to the first optical transmitter. The optical system also includes an optical cavity for seeding the first reflective optical amplifier with a first optical seed signal. The optical cavity is formed between the first reflective optical amplifier of the first optical transmitter and the second reflective optical amplifier of the second optical transmitter. The first reflective optical amplifier is configured to transmit a first optical signal to the second reflective optical amplifier and the second reflective optical amplifier is configured to provide the first optical seed signal by reflecting a portion of the first optical signal back to the first reflective optical amplifier.

18 Claims, 9 Drawing Sheets

(51) Int. Cl.
*H04B 10/40* (2013.01)
*H04B 10/516* (2013.01)
*H04B 10/60* (2013.01)
*H04J 14/02* (2006.01)

(52) U.S. Cl.
CPC .......... *H04B 10/516* (2013.01); *H04B 10/60* (2013.01); *H04J 14/02* (2013.01)

(56) References Cited

OTHER PUBLICATIONS

PCT International Search Report and Written Opinion dated Oct. 26, 2018 for International Application PCT/EP2018/052276, 12 pages.
Saliou, F. et al., "125-km Long Cavity Based on Self-Seeded RSOAs Colorless Sources for 2.5-GB/s DWDM Networks", IEEE Journal of Lightwave Technology, Apr. 15, 2015, vol. 33, No. 8, New York, NY, USA, pp. 1602-1607.
Simon, Gael et al., "70km External Cavity DWDM Sources Based on 0-Band Self Seeded RSOAs for Transmissions at 2.5Gbit/s", OFC 2014, OSA, San Francisco, CA, USA, Mar. 9-13, 2014, pp. 1-3.
Le, S. D. et al., "Up to 60 km Bidirectional Transmission of a 16 Channels 10 Gb/s FDM-WDM PON Based on Self-Seeded Reflective Semiconductor Optical Amplifiers", OFC, OSA, San Francisco, CA, USA, Mar. 9-13, 2014, pp. 1-3.
Deniel, Qian et al., "Self-seeded RSOA Based WDM-PON Transmission Capacities", Optical Fiber Communication Conference and Exposition and the National Fiber Optic Engineers Conference (OFC/NFOEC), Anaheim, CA, USA, Mar. 17-21, 2013, pp. 1-3.
Duarte, U. R. et al., "Combined Self-Seeding and Carrier Remodulation Method for Reflective Transmitters in WDM-PON", Optical Fiber Communication Conference and Exposition and the National Fiber Optic Engineers Conference (OFC/NFOEC), Anaheim, CA, USA, Mar. 17-21, 2013, pp. 1-3.
Wong, Elaine et al., "Directly Modulated Self-Seeding Reflective Semiconductor Optical Amplifiers as Colorless Transmitters in Wavelength Division Multiplexed Passive Optical Networks", Journal of Lightwave Technology, vol. 25, No. 1, Jan. 2007, pp. 67-74.
Cheng, Ning et al., "Reflective Crosstalk Cancellation in Self-Seeded WDM PON for Mobile Fronthaul/Backhaul," Journal of Lightwave Technology, vol. 34, No. 8, Apr. 15, 2016, pp. 2056-2063.

\* cited by examiner

10

Seed a first optical transmitter in an optical system by using a second optical transmitter to provide a first optical seed signal for the first optical transmitter, wherein the first optical transmitter comprises a first reflective optical amplifier and the second optical transmitter comprises a second reflective optical amplifier

12

Provide the first optical seed signal at the second optical transmitter by reflecting, by the second reflective optical amplifier, at least a portion of a first optical signal received from the first optical transmitter

OPTICAL SYSTEM AND METHOD FOR SEEDING AN OPTICAL TRANSMITTER

CROSS-REFERENCE TO RELATED APPLICATIONS

This application is a 35 U.S.C. § 371 national stage application for International Application No. PCT/EP2018/052276, entitled "OPTICAL SYSTEM AND METHOD FOR SEEDING AN OPTICAL TRANSMITTER", filed on Jan. 30, 2018, the disclosure of which is hereby incorporated by reference in its entirety.

TECHNICAL FIELD

The present disclosure relates to an optical system and method for seeding an optical transmitter.

BACKGROUND

Telecommunication networks continue to evolve. $5^{th}$ Generation (5G) networks are expected to bring about a major telecommunications transformation, providing an end-to-end infrastructure which is capable of providing a consistently high user quality of experience across heterogeneous network environments and for a wide range of use cases. Depending on the particular use case, performance demands may require high throughput, low latency, high reliability, high connectivity density, and/or high mobility range. To facilitate such a transformation, the underlying physical and logical telecommunications network infrastructure is subject to continuing development.

One part of the telecommunications network infrastructure is an optical transport network. An optical transport network includes one or more optical network elements which are typically interconnected by fiber optic cables and which are configured to provide specific functions, such as transport, multiplexing, switching, management, and resilience of optical channels carrying optical data signals.

Wavelength-division multiplexing (WDM) is a technique which has been widely used in optical communication networks. In WDM, a number of optical carrier signals, each having a different wavelength, are multiplexed onto a single optical fiber. WDM technology can provide high channel capacity and high data rates.

WDM technology has recently found application in the access network of telecommunication networks. For example, the second-stage next-generation passive optical network (NG-PON2) standard introduced WDM as an overlay to existing time-division multiplexing passive optical network (TDM-PON) techniques. However, a challenge in the adoption of WDM in access networks lies in the provision of a cost-effective, uncooled WDM transmitter. For transmitting signals at a range of different wavelengths, one option is to provide a large number of pre-selected lasers. However, this would not be convenient or desirable for operators, manufacturers, or equipment maintenance personnel. Instead, widely tunable lasers may be used. Such lasers may be configured to emit light at wavelengths corresponding to free channels on a WDM optical fiber. Although widely tunable lasers are available, deployment of such lasers in access networks is limited by cost and calibration difficulties. The NG-PON2 standard addresses these problems only in part, by retaining the TDM functionality and using lasers of very limited tunability, for example up to 400 GHz.

A self-seeding transmitter is known from a paper by Wong et al.: "Directly Modulated Self-Seeding Reflective Semiconductor Optical Amplifiers as Colorless Transmitters in Wavelength Division Multiplexed Passive Optical Networks", Journal of Lightwave Technology, Vol. 25, No. 1, 1 Jan. 2007, pp. 67-74. A reflective semiconductor optical amplifier (RSOA) at an optical network unit (ONU) terminal generates broadband amplified spontaneous emission (ASE) light. The light is transmitted upstream. A wavelength division multiplexer (WDM), in the form of an arrayed waveguide grating (AWG), at a remote node reflects a spectral slice of the broadband light back to the terminal for use as a seeding light. This locks the transmitted wavelength of the RSOA. The RSOA is directly modulated with upstream data. The operating wavelength of a remote (ONU) terminal is determined by the WDM port that the terminal is connected to. Although a self-seeded source is not strictly a laser, it effectively acts as a self-tunable optical transmitter and is able to address many of the problems associated with tunable laser implementations. For example, it has been demonstrated that self-seeding transmitters may be operated without cooling. Self-seeding transmitters may also be implemented without calibration, since the wavelength selection is determined by the configuration of the optical network itself. Furthermore, self-seeding transmitters may be directly modulated for data transmission at rates up to 10 Gb/s and may also be used to transmit radio-over-fiber signals.

An improvement to the self-seeded system uses a polarization-insensitive reflective device, such as a Faraday mirror, to reflect back to the transmitter a given portion of the emitted light. This improvement is described in WO-A1-2012/034604.

The above self-seeding transmitters have been limited in application to tree-and-branch topologies, where the wavelength assignment to each network branch is fixed; that is, the wavelength assignment is not reconfigurable during operation. This can be a limiting factor for deployment of self-seeding transmitters in next-generation access networks, where the topologies may take a variety of forms; for example, a ring or bus of optical add-drop multiplexers. In addition, runtime configurability may be desirable or required in the future, for example, to support 5G fronthaul operations. WO-A1-2014/106542 provides an optical network apparatus for self-seeded communications, using a topology based on reconfigurable optical add-drop multiplexers (ROADMs).

In the above topology examples, a partially reflective Faraday mirror is used to initiate the self-seeding. While such partially reflective mirror is a passive device, it represents an additional source of cost and is not typically embedded in commercially available or standardized AWGs or ROADMs. A partially reflective Faraday mirror also cannot be fabricated in silicon photonics which could otherwise help to reduce component costs. In addition, a partially reflective Faraday mirror includes a Faraday rotator, which itself includes optically active materials. Such materials cannot be readily integrated into small form-factor photonic circuits.

The above considerations limit the use of self-seeding technology in telecommunications networks. It would therefore be desirable to provide an alternative and/or improved optical system and method for seeding an optical transmitter.

SUMMARY

According to a first aspect, there is provided an optical system for seeding an optical transmitter. The optical system comprises a first optical transmitter comprising a first reflective optical amplifier and a second optical transmitter comprising a second reflective optical amplifier. The second optical transmitter is optically coupled to the first optical transmitter. The optical system also comprises an optical cavity for seeding the first reflective optical amplifier with a first optical seed signal. The optical cavity is formed between the first reflective optical amplifier of the first optical transmitter and the second reflective optical amplifier of the second optical transmitter. The first reflective optical amplifier is configured to transmit a first optical signal to the second reflective optical amplifier and the second reflective optical amplifier is configured to provide the first optical seed signal by reflecting a portion of the first optical signal back to the first reflective optical amplifier.

In this way, the optical system offers a self-seeding configuration which does not require partially reflective elements to be provided in the network, such as at a remote node. This can offer significant cost and installation savings. Instead, the second reflective optical amplifier of the second optical transmitter is configured to operate as the reflective element for seeding the first optical transmitter. The first reflective optical amplifier of the first optical transmitter is configured to generate a first optical signal by broadband amplified spontaneous emission. A portion of the first optical signal is reflected back to the first reflective optical amplifier by the second reflective optical amplifier as a first optical seed signal. The seed signal serves to lock the first optical signal to the wavelength, or wavelength band or channel, of the seed signal. The optical cavity for seeding the first optical transmitter thus comprises the first reflective optical amplifier, the second reflective optical amplifier, and the optical communication path therebetween. In this way, the reflective element for seeding the first optical transmitter is shifted to the second optical transmitter, at the optical link end or terminal, rather than being provided at a remote node, or distribution node, in the network. The first optical transmitter may be provided at a first terminal, or first optical communication link end, and the second optical transmitter may be provided at a second terminal, or second optical communication link end. The first and second optical transmitters may be optically coupled for communication by an optical communication link, such as an optical fiber. The optical communication link may form part or all of an optical communication network. First and second remote nodes, or distribution nodes, may be provided on the optical communication link to route optical signals transmitted from the first optical transmitter to the second optical transmitter and vice versa.

The optical system may be compatible with and be implemented in known or 'regular' WDM networks. The optical system may make use of, and be built upon, existing WDM—including dense WDM (DWDM)—communication links and networks, regardless of their topology (such as tree-and-branch, a series of optical add-drop multiplexers (OADMs), or rings with ROADMs). In addition, the wavelength, or wavelength channel, at which the first optical transmitter is seeded may be fixed or dynamically assigned; the optical system is compatible with either arrangement.

With the optical system, the self-seeding acts between the respective first and second transmitter pair—that is, on the individual channel for the respective transmitters—rather than on the whole (D)WDM spectrum. Indeed, the optical system may coexist with one or more other optical transmission techniques, including fixed laser, tunable laser, and other self-seeding transmitters. The optical system may also operate at bit rates independent of bit rates of other transmissions in the network, which may therefore be the same or different. This offers the possibility to upgrade an existing network by implementing the optical system in different parts of the network in stages.

Optionally, the first optical seed signal comprises a first wavelength and the first reflective optical amplifier is configured to transmit the first optical signal at the first wavelength in response to the first optical seed signal. In this way, the optical signal transmitted by the first optical transmitter may be locked, fixed, or tuned to the first wavelength, or to a wavelength channel comprising the first wavelength.

The optical system may further comprise a first wavelength-selective filter optically coupled between the first and second optical transmitters for selectively passing the first wavelength. The wavelength-selective filter may be set to a fixed wavelength or may be (re)configurable during operation, based on operational requirements and available, or free, wavelength channels in the network. Suitable wavelength-selective filters can include optical (de)multiplexers, such as arrayed waveguide gratings (AWGs), OADMs, and/or ROADMs. An advantage of the optical system is that it may be implemented without the need for custom-developed parts, but may use commercially available optical elements.

The optical cavity may be further configured for seeding the second reflective optical amplifier with a second optical seed signal. The second reflective optical amplifier may be configured to transmit a second optical signal to the first reflective optical amplifier and the first reflective optical amplifier may be configured to provide the second optical seed signal by reflecting a portion of the second optical signal back to the second reflective optical amplifier. In this way, the first optical transmitter may be used in the seeding of the second optical transmitter while the second optical transmitter is used in the seeding of the first optical transmitter. In such an arrangement, the optical system may be configured to operate similarly, correspondingly, or symmetrically at each transmitter.

The second optical seed signal may comprise the first wavelength and the second reflective optical amplifier may be configured to transmit the second optical signal at the first wavelength in response to the second optical seed signal. In this way, the first and second optical seed signals may be provided with the same seeding wavelength. As a result, the first and second optical transmitters may be configured to transmit respective first and second optical signals at the same wavelength. In contrast, in the prior arrangements discussed above, a first transmitter is seeded using its add/drop fiber to a first partially reflecting mirror at a first remote, distribution node, with the seeding being in a first wavelength band, such as the C band (1530-1565 nm). A second transmitter is seeded using its add/drop fiber to a second partially reflecting mirror at a second remote, distribution node, with the seeding being in a second wavelength band, such as the L band (1565-1625 nm). Embodiments of the optical system may therefore offer the possibility of an increased number of available wavelength channels to be used in the network, by using the same wavelength for upstream and downstream communication.

It is further noted that, in the prior arrangements, the second transmitter is not configured to and cannot seed the first transmitter, because the first transmitter is seeded for transmission at the downstream wavelength, such as a C-band wavelength, while the second transmitter is seeded for transmission at the upstream wavelength, such as an L-band wavelength. Of course, the physically separate optical seeding cavities for the first and second transmitters also means this is not possible.

The optical system may further comprise a second wavelength-selective filter optically coupled between the first and second optical transmitters for selectively passing the first wavelength. This can help ensure that optical signals are suitably directed between the first and second optical transmitters, without other optical signals at different wavelengths being passed.

Optionally, the first and second wavelength-selective filters comprise first and second wavelength-division multiplexing filters. In this way, the optical signals between the first and second optical transmitters may be multiplexed onto, and demultiplexed from, an optical fiber communication link over which the first and second transmitters, among others, communicate.

The first and second optical transmitters may be optically coupled by an optical communication link. The optical cavity may therefore comprise the first reflective optical amplifier of the first optical transmitter, the optical communication link, and the second reflective optical amplifier of the second optical transmitter. In this way, the optical cavity for seeding the first optical transmitter may be the same optical cavity for seeding the second optical transmitter. In contrast, in the prior arrangements discussed above, a first transmitter is seeded using its add/drop fiber to a first partially reflecting mirror at a first remote, distribution node. A second transmitter is seeded using its add/drop fiber to a second partially reflecting mirror at a second remote, distribution node, where the distribution nodes are separated by an optical fiber link. That is, in the prior arrangements, the optical cavities for seeding the first and second transmitters are separate and independent, both functionally, physically, and geographically. Embodiments of the optical system may use an existing fiber optic communication link with the first and second optical transmitters configured at either end of the link to provide the optical seeding cavity. It is therefore not necessary to install and configure individual partial reflectors at distribution nodes either side of the optical fiber link to provide separate optical cavities.

Optionally, the optical system further comprises a first optical transceiver, the first optical transceiver comprising the first optical transmitter and a first optical receiver. The first and second optical transmitters may be configured to transmit a respective first and second modulated optical signal. The first optical receiver may be configured to receive a first receiver optical signal, the first receiver optical signal comprising the second modulated optical signal from the second optical transmitter and a reflected first modulated optical signal from the first optical transmitter. The first optical transceiver may further comprise a first crosstalk cancellation module for removing the reflected first modulated optical signal from the first receiver optical signal. In this way, for downstream and upstream communication between the first and second optical transmitters at the same wavelength, crosstalk or interference may be removed or cancelled. In particular, the first optical receiver may receive a second modulated optical signal transmitted by the second optical transmitter. In addition, part of a first modulated optical signal transmitted by the first optical transmitter may be received by the second reflective optical amplifier of the second optical transmitter and reflected back to the first optical transceiver. The first optical receiver may therefore undesirably receive a portion of the reflected first modulated signal in addition to the second modulated optical signal transmitted by the second optical transmitter. The contribution to the received signal by the portion of the reflected first modulated signal may be cancelled, however. In particular, since the first modulated optical signal is transmitted from the first optical transceiver itself and is therefore fully known, the first crosstalk cancellation module may be configured to take this into account. For example, the first crosstalk cancellation module may be configured to remove the reflected first modulated optical signal from the first receiver optical signal based on the first modulated optical signal transmitted by the first optical transmitter and a first delay time for the first modulated optical signal to be transmitted from the first optical transmitter to the second reflective optical amplifier and back to the first optical receiver.

The optical system may further comprise a second optical transceiver, the second optical transceiver comprising the second optical transmitter and a second optical receiver. The second optical receiver may be configured to receive a second receiver optical signal, the second receiver optical signal comprising the first modulated optical signal from the first optical transmitter and a reflected second modulated optical signal from the second optical transmitter. The second optical transceiver may further comprise a second crosstalk cancellation module for removing the reflected second modulated optical signal from the second receiver optical signal. In this way, transmissions in the other direction, received at the second optical transceiver, may account for signal reflections based on the second modulated optical signal transmitted by the second optical transceiver itself.

The second crosstalk cancellation module may similarly be configured to remove the reflected second modulated optical signal from the second receiver optical signal based on the second modulated optical signal transmitted by the second optical transmitter and a second delay time for the second modulated optical signal to be transmitted from the second optical transmitter to the first reflective optical amplifier and back to the second optical receiver.

Optionally, the optical system may further comprise an optical network, wherein the optical network comprises one or more of a mesh network, a ring network, a series network, and/or a tree-and-branch network. Embodiments of the optical system may therefore offer a wide range of implementation possibilities.

According to a second aspect, there is provided a method of seeding a first optical transmitter in an optical system by using a second optical transmitter to provide a first optical seed signal for the first optical transmitter. The first optical transmitter comprises a first reflective optical amplifier and the second optical transmitter comprises a second reflective optical amplifier. The first optical seed signal is provided at the second optical transmitter by reflecting, by the second reflective optical amplifier, at least a portion of a first optical signal received from the first optical transmitter.

According to a further aspect, there is provided an optical system comprising a first optical transceiver, a second optical transceiver, and an optical communication link optically coupled between the first and second optical transceivers. The first optical transceiver comprises a first optical transmitter comprising a first reflective optical amplifier; and a first optical receiver. The second optical transceiver comprises a second optical transmitter comprising a second reflective optical amplifier; and a second optical receiver. The first optical transmitter is configured to transmit a first optical signal to the second optical receiver, and the second optical transmitter is configured to transmit a second optical signal to the first optical receiver. The second reflective optical amplifier of the second optical transmitter is configured to receive a portion of the first optical signal and to reflect the portion of the first optical signal back to the first reflective optical amplifier as a first optical seed signal for the first reflective optical amplifier. The first reflective optical amplifier of the first optical transmitter is configured to receive a portion of the second optical signal and to reflect the portion of the second optical signal back to the second reflective optical amplifier as a second optical seed signal for the second reflective optical amplifier.

Optionally, the optical system further comprises a plurality of respective first and second transceiver pairs configured for optical communication on respective wavelength channels over the optical communication link; a first wavelength router optically coupled between the first transceivers and the optical communication link for routing respective wavelength channels between the first transceivers and the optical communication link; and a second wavelength router optically coupled between the second transceivers and the optical communication link for routing the respective wavelength channels between the second transceivers and the optical communication link.

Optionally, each wavelength channel between a respective first reflective optical amplifier of a first optical transmitter and a respective second reflective optical amplifier of a second optical transmitter provides a respective optical cavity for seeding the first and second reflective optical amplifiers of the respective transceiver pair.

Any of the features and embodiments of the optical systems described herein may be implemented with the features and embodiments of the methods described herein. Similarly, any of the features and embodiments of the methods described herein may be implemented with the features and embodiments of the optical systems described herein.

Other preferred features and advantages are set out in the description and in the dependent claims which are appended hereto.

BRIEF DESCRIPTION OF THE DRAWINGS

Examples of the disclosure may be put into practice in a number of ways and some embodiments will now be described, by way of non-limiting example only, with reference to the following figures, in which:

FIG. 13 shows a flowchart of a method for seeding an optical transmitter in accordance with a further embodiment.

DETAILED DESCRIPTION

Figure 1:
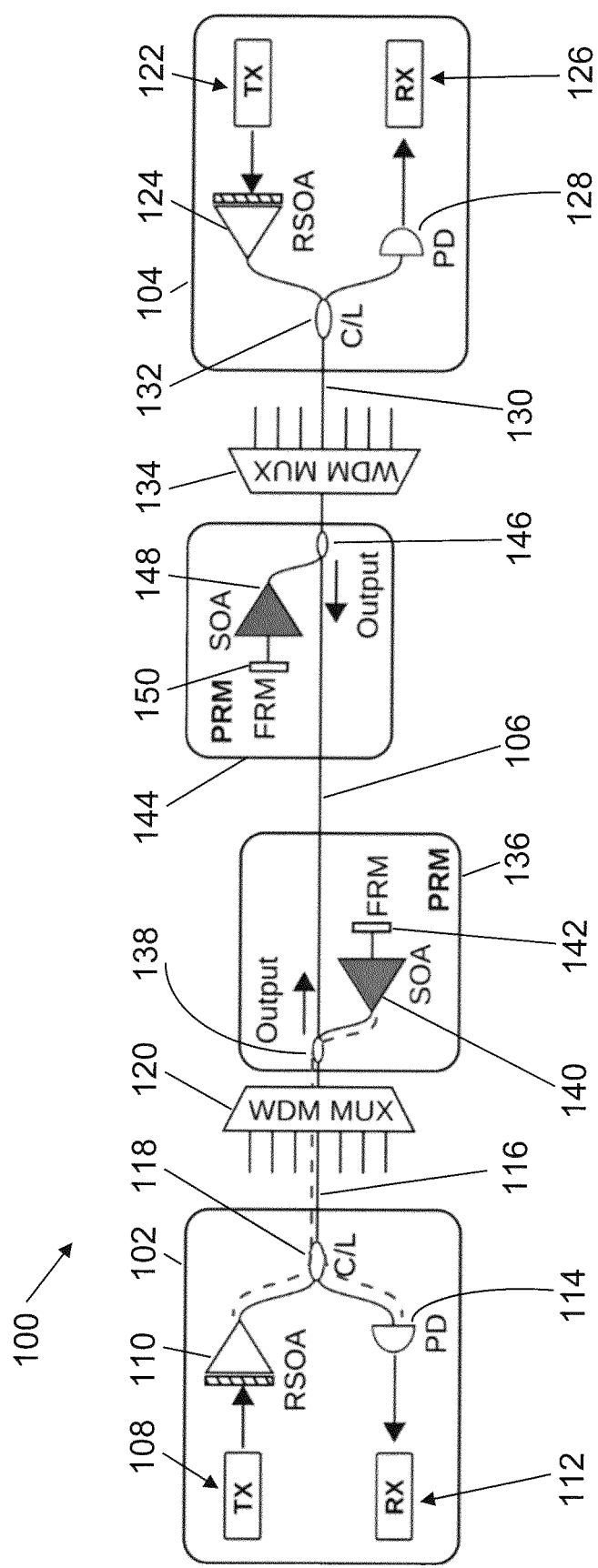
FIG. 1 schematically shows a self-seeding configuration using partially reflective mirrors.

Referring to FIG. 1, there is shown a self-seeding system 100 using partially reflective mirrors. The system 100 includes a first optical transceiver 102 and a second optical transceiver 104, optically coupled to each other by an optical fiber communication link 106.

The first transceiver 102 includes a first, or downstream, transmitter (TX) 108 for transmitting optical signals downstream to the second transceiver 104. The first transmitter 108 includes a first reflective semiconductor optical amplifier (RSOA) 110, which can operate as a wide-band gain emitter. The first transceiver 102 also includes a first, or upstream, receiver (RX) 112 for receiving optical signals upstream from the second transceiver 104. The first receiver 112 includes a first photodiode (PD) 114. The first transmitter 108 and the first receiver 112 of the first transceiver 102 are optically coupled to an external, first add/drop fiber 116 via a first optical bandpass filter (C/L) 118. The first filter 118 is configured to pass C-band wavelengths to and from the first transmitter 108 and to pass L-band wavelengths to the first receiver 112. The first add/drop fiber 116 is arranged to carry the C- and L-band wavelength signals to/from the first transceiver 102. In particular, the first add/drop fiber 116 optically couples the first transceiver 102 to the optical fiber 106 via a WDM multiplexer (WDM MUX) in the form of a first AWG 120. The first AWG 120 is located at a first remote node, or distribution node, and optically couples signals between the optical fiber 106 and a plurality of first transceivers, of which the first transceiver 102 is one. Each port of the first AWG 120 is assigned a different wavelength channel, or spectral slice, from the WDM spectrum, and each transceiver connected to a respective port is configured to operate at the respective wavelength band of that port.

Similarly, the second transceiver 104 includes a second, or upstream, transmitter (TX) 122 for transmitting optical signals upstream to the first transceiver 102. The second transmitter 122 includes a second reflective semiconductor optical amplifier (RSOA) 124, which can operate as a wide-band gain emitter. The second transceiver 104 also includes a second, or downstream, receiver (RX) 126 for receiving optical signals downstream from the first transceiver 102. The second receiver 126 includes a second photodiode (PD) 128. The second transmitter 122 and the second receiver 126 of the second transceiver 104 are optically coupled to an external, second add/drop fiber 130 via a second optical bandpass filter (C/L) 132. The second filter 132 is configured to pass L-band wavelengths to and from the second transmitter 122 and to pass C-band wavelengths to the second receiver 126. The second add/drop fiber 130 is arranged to carry the C- and L-band wavelength signals to/from the second transceiver 104. In particular, the second add/drop fiber 130 optically couples the second transceiver 104 to the optical fiber 106 via a WDM multiplexer (WDM MUX) in the form of a second AWG 134. The second AWG 134 is located at a second remote node, or distribution node, and optically couples signals between the optical fiber 106 and a plurality of second transceivers, of which the second transceiver 104 is one. Each port of the second AWG 134 is assigned a different wavelength channel, or spectral slice, from the WDM spectrum, and each transceiver connected to a respective port is configured to operate at the respective wavelength band of that port. A respective pair of first and second transceivers may thereby be configured to transmit and receive optical signals between each other based on being coupled to the same respective ports of the first and second AWGs.

In order to seed the first RSOA 110—and indeed any other RSOAs of transceivers coupled to the first AWG 120—a first partially reflective mirror (PRM) 136 is provided at the first remote node. The first PRM 136 is coupled to the WDM port of the first AWG 120, on the optical fiber 106 side, via a first optical power splitter 138. The first splitter 138 directs a portion of the optical signals transmitted downstream from the first AWG 120 to a first semiconductor optical amplifier (SOA) 140 and a first Faraday rotator mirror (FRM) 142. The remainder is passed downstream on the optical fiber 106. The first RSOA 110 generates broadband amplified spontaneous emission (ASE) light. A portion of the light is received, amplified, and reflected back by the first PRM 136 to the first AWG 120. The first AWG 120 passes a spectral slice of the broadband light back to the first RSOA 110 as a seeding light. This locks the transmitted wavelength of the first RSOA 110 to the spectral slice. The first RSOA 110 may then be directly modulated with downstream data for transmission to the second transceiver 104. In this way, the first PRM 136, with a pass-band optical filter (one of the first AWG 120 ports) and the first add/drop fiber 116, creates an optical seeding cavity for the first transmitter 108. Indeed, the first PRM 136 may create many parallel optical cavities for each transceiver connected to the first AWG 120, with the first PRM 136 being common to all of them and the seed wavelength for each respective optical cavity being determined by the respective port of the first AWG 120.

In order to seed the second RSOA 124—and indeed any other RSOAs of transceivers coupled to the second AWG 134—a second PRM 144 is provided at the second remote node. The second PRM 144 is coupled to the WDM port of the second AWG 134, on the optical fiber 106 side, via a second optical power splitter 146. The second splitter 146 directs a portion of the optical signals transmitted upstream from the second AWG 134 to a second SOA 148 and a second FRM 150. The remainder is passed upstream on the optical fiber 106. The seeding of the second RSOA 124 takes place in a corresponding manner to that for the first RSOA 110, discussed above.

Figure 2:
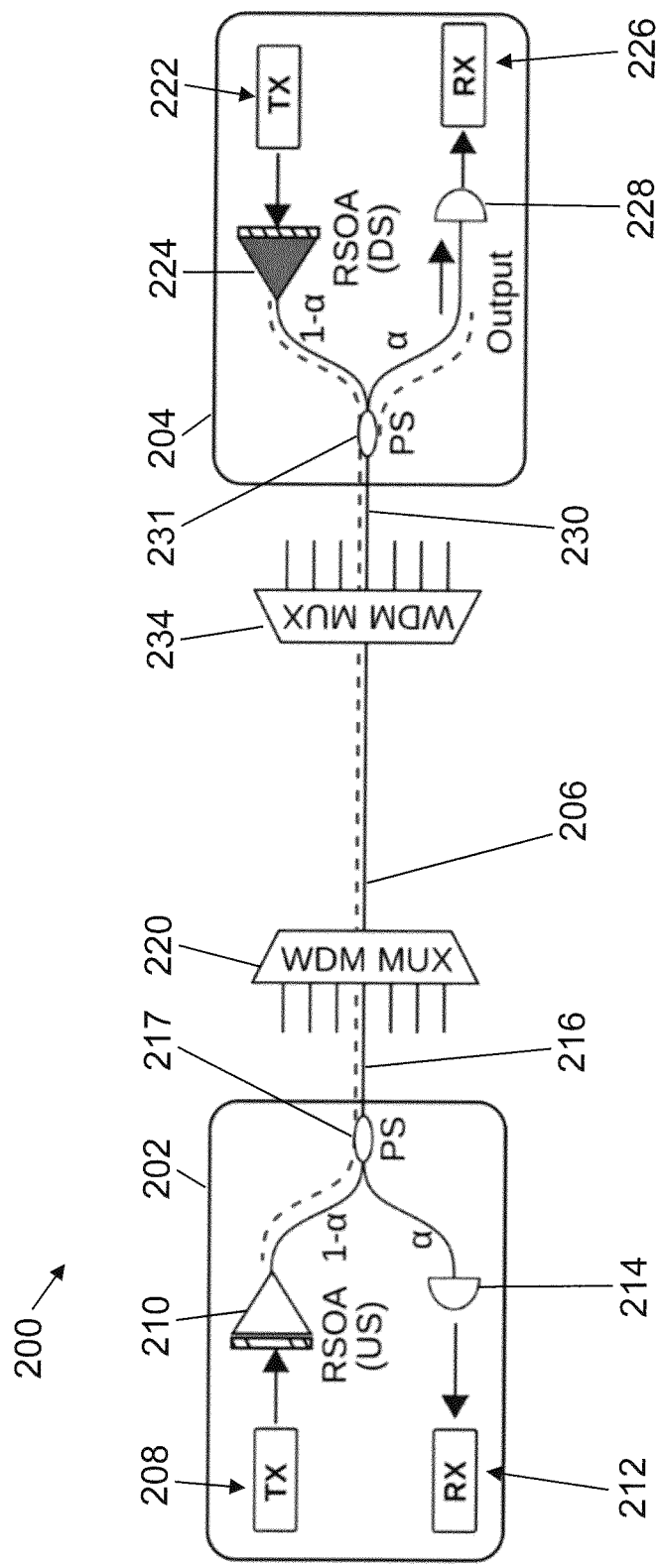
FIG. 2 schematically shows a self-seeding configuration in accordance with a first embodiment.

Referring to FIG. 2, there is shown an optical system 200 for seeding an optical transmitter in accordance with a first embodiment. The optical system 200 includes a first optical transmitter 208 including a first reflective optical amplifier 210 and a second optical transmitter 222 including a second reflective optical amplifier 224. The second optical transmitter 222 is optically coupled to the first optical transmitter 208. The optical system 200 also includes an optical cavity for seeding the first reflective optical amplifier 210 with a first optical seed signal. The optical cavity is formed between the first reflective optical amplifier 210 of the first optical transmitter 208 and the second reflective optical amplifier 224 of the second optical transmitter 222. The first reflective optical amplifier 210 is configured to transmit a first optical signal to the second reflective optical amplifier 224 and the second reflective optical amplifier is configured to provide the first optical seed signal by reflecting a portion of the first optical signal back to the first reflective optical amplifier 210.

In some aspects, the system 200 includes a first optical transceiver 202 and a second optical transceiver 204, optically coupled to each other by an optical fiber communication link 206. The first optical transceiver 202 is remote from the second optical transceiver 204, i.e. at different nodes of a network. The first transceiver 202 includes a first, or downstream, transmitter (TX) 208 for transmitting optical signals downstream to the second transceiver 204. The first transmitter 208 includes a first RSOA 210, which can operate as a wide-band gain emitter. The first transceiver 202 also includes a first, or upstream, receiver (RX) 212 for receiving optical signals upstream from the second transceiver 204. The first receiver 212 includes a first photodiode 214. The first transmitter 208 and the first receiver 212 of the first transceiver 202 are optically coupled to an external, first add/drop fiber 216 via a first optical power splitter (PS) 217. The first splitter 217 is configured to split incoming, upstream optical signals on the first add/drop fiber 216 between the first receiver 212 and the first transmitter 208 in a ratio $\alpha:(1-\alpha)$. In the downstream direction, the first splitter 217 passes optical signals from the first transmitter 208 into the first add/drop fiber 216. The first add/drop fiber 216 optically couples the first transceiver 202 to the optical fiber 206 via a first wavelength-selective filter or wavelength-selective optical router, such as a first WDM multiplexer (WDM MUX) 220. The first WDM multiplexer 220 may be provided by an AWG, an OADM, or a ROADM. The first WDM multiplexer 220 may be located at a first remote node, or distribution node, and optically couples signals between the optical fiber 206 and the first transceiver 202. The port of the first WDM multiplexer 220 to which the first transceiver 202 is coupled is configured to selectively pass a given spectral slice, or wavelength channel, from the WDM spectrum. The first transceiver 202 may thereby be configured to operate at the respective wavelength channel of that port.

Similarly, the second transceiver 204 includes a second, or upstream, transmitter (TX) 222 for transmitting optical signals upstream to the first transceiver 202. The second transmitter 222 includes a second RSOA 224, which can operate as a wide-band gain emitter. The second transceiver 204 also includes a second, or downstream, receiver (RX) 226 for receiving optical signals downstream from the first transceiver 202. The second receiver 226 includes a second photodiode 228. The second transmitter 222 and the second receiver 226 of the second transceiver 204 are optically coupled to an external, second add/drop fiber 230 via a second via a second optical power splitter (PS) 231. The second splitter 231 is configured to split incoming, downstream optical signals on the second add/drop fiber 230 between the second receiver 226 and the second transmitter 222 in a ratio $\alpha:(1-\alpha)$. In the upstream direction, the second splitter 231 passes optical signals from the second transmitter 222 into the second add/drop fiber 230. The second add/drop fiber 230 optically couples the second transceiver 204 to the optical fiber 206 via a second wavelength-selective filter or wavelength-selective optical router, such as a second WDM multiplexer (WDM MUX) 234. The second WDM multiplexer 234 may be provided by an AWG, an OADM, or a ROADM. The second WDM multiplexer 234 may be located at a second remote node, or distribution node, and optically couples signals between the optical fiber 206 and the second transceiver 204. The port of the second WDM multiplexer 234 to which the second transceiver 204 is coupled is configured to selectively pass a given spectral slice, or wavelength channel, from the WDM spectrum. The second transceiver 204 may thereby be configured to operate at the respective wavelength channel of that port. Furthermore, by arranging the first and second transceivers 202,204 to be coupled to corresponding ports of the first and second WDM multiplexers 220,234 respectively, the first and second transceivers may be configured for optical communication with one another.

A process for self-seeding the first transmitter 208 will now be described. Self-seeding means that the transmitter or optical system does not require a seed signal from an external source. The first RSOA 210 generates a first optical signal by broadband amplified spontaneous emission (ASE). The first optical signal is transmitted downstream on the first add/drop fiber 216, to the first WDM multiplexer 220. The first WDM multiplexer 220 has the effect of filtering the broadband ASE signal as it passes through the WDM multiplexer so that a spectral slice of the signal is passed. The spectral slice may represent a given, first wavelength channel in the WDM spectrum. The wavelength channel may be centered on a given, first wavelength. The filtered first optical signal continues downstream onto the optical fiber 206 and towards the second transceiver 204, via the second WDM multiplexer 234. The first wavelength channel is passed by one of the ports of the second WDM multiplexer 234 and coupled therefrom into the second add/drop fiber 230 and to the second RSOA 224. A portion of the incoming, downstream first optical signal is reflected by the second RSOA 224 back towards the first RSOA 210 as a first optical seed signal for the first RSOA 210. The first optical seed signal is thereby provided to the first transmitter 208 to seed the first RSOA 210 at the first wavelength, or first wavelength channel, of the first optical seed signal. The first RSOA 210 may thus be tuned or locked to emit at the given wavelength.

In this way, an optical cavity is formed which includes the first RSOA 210, the second RSOA 224, the first and second add/drop fibers 216,230, and the optical fiber 206. That is, the optical cavity for the seeding light is provided by the full optical communication path between the first and second RSOAs 210,224. In other words, the optical cavity may be formed by the full terminal-to-terminal optical link between a first transmitter terminal and a second transmitter terminal across an optical network.

The first transmitter 208 may be configured to drive the first RSOA 210 with a data signal. In this way, the first transmitter 208 may generate a modulated first optical signal for downstream transmission to the second transceiver 204.

The second optical transmitter 222 may be configured for self-seeding in a corresponding way, with corresponding elements having the same function, so a repeat description will not be provided here. Importantly, though, with the configuration shown in FIG. 2, both the first transmitter 210 and the second transmitter 222 may be seeded with optical seed signals at the same wavelength or wavelength channel. This is in distinct contrast to the arrangement shown in FIG. 1, in which the first transmitter 108 is seeded and arranged to transmit light in a different wavelength band—for example, the C band—from the second transmitter 122, which is seeded and arranged to transmit light in, for example, the L band. As such, it is noted that the second transmitter 122 is not configured and could not be suitable for use in the seeding of the first transmitter 108, because the first transmitter 108 is seeded for transmission at the downstream wavelength in the downstream wavelength band, while the second transmitter 122 is seeded for transmission at the upstream wavelength in the upstream wavelength band. Moreover, the first transmitter 108 is seeded by a first optical cavity formed between the first transmitter and the first remote node, while the second transmitter 122 is seeded by a second optical cavity formed between the second transmitter and the second remote node, the second optical cavity being fully separate and independent from the first optical cavity.

In some embodiments, at the link ends, the first and second transceivers 202,204 may be identical. In this case, the optical system can be seen to be fully symmetric; in particular, with both RSOAs 210,224 performing the same respective functions.

The first and second power splitters 217,231 may be configured as unbalanced power splitters, such that the ratio $\alpha:(1-\alpha)$ is not 50:50. Generally, there is a trade-off to be found between the desire to sustain gain in the optical cavity, by setting a (i.e., the proportion of the signal split to the receiver) relatively low, and the desire to ensure that the receiver can operate to a given sensitivity, by setting a relatively high. In any particular implementation, these factors can be tested and optimized to select an appropriate value or values for a. Suitable values for a are expected to be around 10%-20%, although other values may be used in some applications. In other words, values of the ratio $\alpha:(1-\alpha)$ of 20:80 and 10:90, and values in-between, have been found to be acceptable.

A discussion of the operating principle of the optical system of FIG. 2 will now be provided. The optical system 200 may initially be configured with the optical cavity operating in a stationary regime. In this regime, the first and second RSOAs 210,224 may be biased by a constant current Ibias. In this case, once the signal gain of the first and second RSOAs 210,224 exactly compensates the cavity losses, the system produces at the first and second receivers 212,226 a continuous wave signal. The continuous wave signal is emitted at the wavelength determined by the first and second WDM multiplexers 220,234. In this regime, the continuous wave signal may be noisy since the optical cavity can support a very large number of longitudinal modes. The detailed behavior of the cavity depends on a number of parameters, such as the cavity length, the coupling ratio, the bandwidth of the WDM multiplexers, among others. In some cases, the behavior of the cavity may be such that chaotic emission results.

When one of the first and second RSOAs 210,224 is modulated by a current, the modulation is transferred to the opposite cavity end. In one example, the first RSOA 210 is modulated while the second RSOA 224 operates only as an amplifying reflector. When the first and second RSOAs 210,224 reach a strong saturation regime, the intensity modulation tends to be reduced. In that case, the second RSOA 224 reflects towards the first RSOA 210 a signal with a reduced modulation index. This signal may then be completely over-written by the first RSOA 210, which may transmit a clean signal to the second photodiode 228 of the second receiver 226.

Figure 3A:
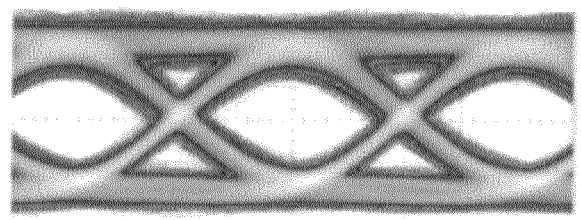
FIG. 3A shows an eye diagram recorded with the upstream transmitter turned off.

FIG. 3A shows an eye-diagram, or eye pattern, taken experimentally at the second receiver 226 when in this condition. Eye diagrams may be used to provide plots showing signal amplitude against time. Generally speaking, an open eye pattern represents a measured signal with low signal distortion, while a more closed eye pattern tends to indicate distortion of the measured signal due to noise, among other factors. In the eye diagram of FIG. 3A, it can be seen that the measured signal appears to be relatively clean or undistorted.

In order to achieve full-duplex and bi-directional transmission, both the first and second RSOAs 210,224 may be modulated simultaneously. In this case, however, it has been found that the system performance suffers from degradation. Indeed, when the second RSOA 224 is also directly modulated along with the first RSOA 210, the signal received at the second receiver 226 is no longer exclusively due to the first transmitter 208. The signal received at the second receiver 226 also includes a residual trace of the modulated signal transmitted by the second RSOA 224 which has been partially reflected by the first RSOA 210. In other words, the second receiver 226 receives both the first modulated signal transmitted by the first RSOA 210 and the second modulated signal transmitted by the second RSOA 224, the second modulated signal being attenuated and delayed by one round-trip time. The round-trip time is the time for the second modulated signal to be transmitted by the second RSOA 224 upstream to the first RSOA 210 and reflected back to the second transceiver 204, to the second receiver 226. The reflected signal provides a source of crosstalk and can severely deteriorate the signal detected at the second receiver 226.

Figure 3B:
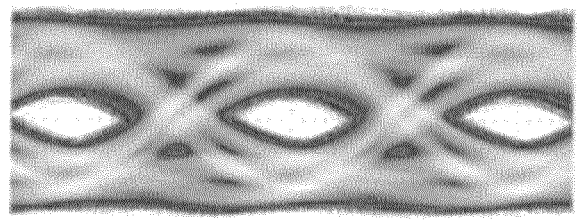
FIG. 3B shows an eye diagram recorded with the upstream transmitter turned on, without crosstalk cancellation.

FIG. 3B shows an eye-diagram, taken experimentally at the second receiver 226 when in this condition. In the eye diagram of FIG. 3B, it can be seen that the eye pattern is relatively closed in comparison to that of FIG. 3A, thus indicating that the measured signal is relatively distorted due to the crosstalk noise.

However, since the second modulated signal transmitted by the second transmitter 222 is exactly known at the second transceiver 204, it is possible to use this information to cancel the crosstalk in the measured signal at the second receiver 226. Indeed, the cancellation may be performed without the need to estimate the extent of the crosstalk noise.

Figure 3C:
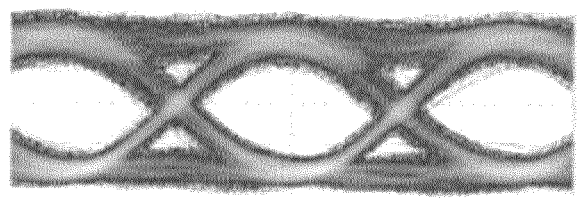
FIG. 3C shows an eye diagram recorded with the upstream transmitter turned on, with crosstalk cancellation.

FIG. 3C shows an eye-diagram, taken experimentally at the second receiver 226 with crosstalk cancellation being implemented. In the eye diagram of FIG. 3C, it can be seen that the eye pattern is relatively open again and relatively close to that shown in FIG. 3A, thus indicating that the adjusted, crosstalk-canceled measured signal is again relatively clean.

Figure 4:
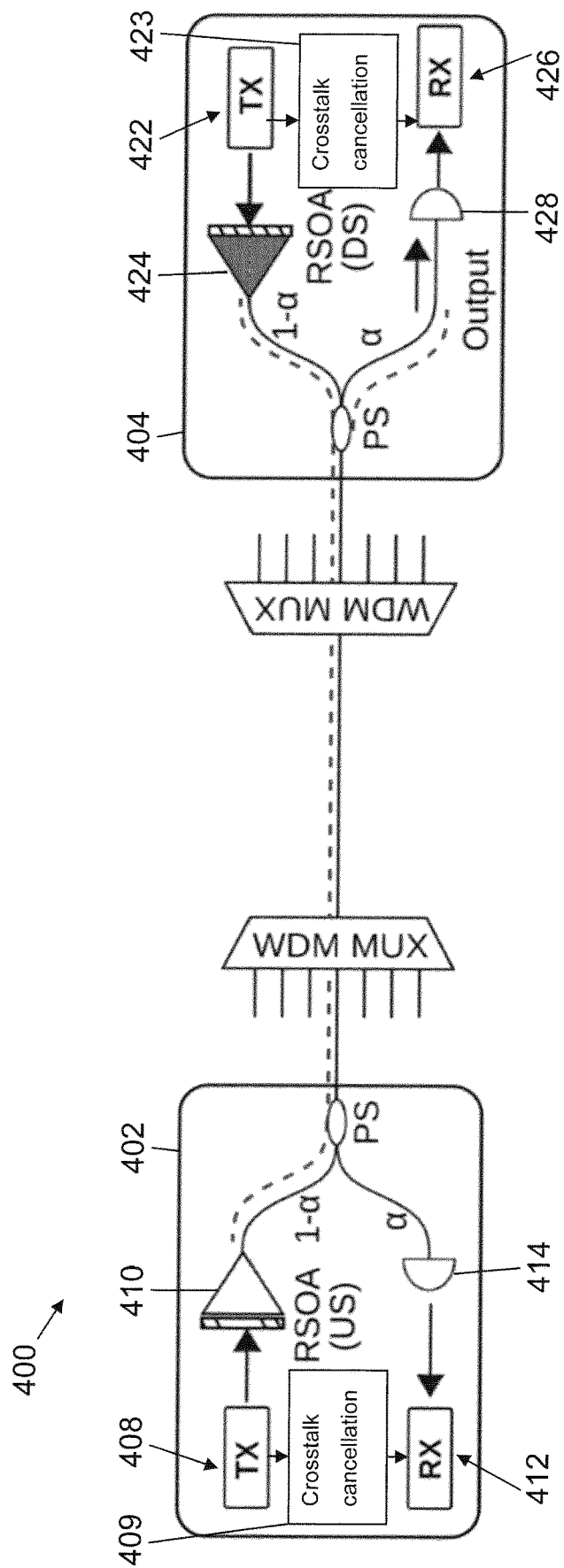
FIG. 4 schematically shows a self-seeding configuration with crosstalk cancellation in accordance with a further embodiment.

FIG. 4 shows schematically an optical system 400 in which crosstalk may be canceled. The optical system 400 is similar to the optical system 200 described above, with corresponding elements having the same function, so a repeat description of the corresponding features will not be provided here. In the optical system 400, the first transceiver 402 additionally includes a first crosstalk cancellation module 409. The first crosstalk cancellation module 409 is operatively configured between the first transmitter 408 and the first receiver 412. Based on the first modulated signal transmitted by the first transmitter 408, the first crosstalk cancellation module 409 adjusts the received signal detected at the first receiver 412 to remove the contribution resulting from reflection of the first modulated signal by the second RSOA 424.

In one embodiment, the first crosstalk cancellation module 409 is configured to remove the reflected first modulated optical signal from the received signal detected at the first receiver 412 based on the first crosstalk cancellation module 409 receiving at least an indication of the first modulated signal from the first transmitter 408. This may be in the form of the modulated drive current signal applied to the first RSOA 410. In some embodiments, the first crosstalk cancellation module 409 may adjust the signal received from the first transmitter 408 to account for attenuation of the reflected first modulated signal relative to the transmitted first modulated signal. In some embodiments, to take into account the round-trip time for the reflected first modulated signal, from transmission by the first transmitter 408 to detection by the first photodiode 414 of the first receiver 412, the reflected first modulated optical signal is removed from the received signal detected at the first receiver 412 with a first delay time. The first delay time corresponds to the time taken for the first modulated optical signal to be transmitted from the first transmitter 408 to the second RSOA 424 and back to the first receiver 412.

In the optical system 400, the second transceiver 404 additionally includes a second crosstalk cancellation module 423. The second crosstalk cancellation module 423 may be configured to operate in a corresponding manner to the first crosstalk cancellation module 409, as will be understood. The second transceiver 404 further includes the second transmitter 422, the second receiver 426, and the second photodiode 428.

The first and second crosstalk cancellation modules 409, 423 may be provided externally to the first and second transceivers 402,404; for example, by signal processing software operating in a transceiver controller. However, it is desirable that the crosstalk cancellation be provided at a speed equal to or faster than the bit rate of the received signal. The crosstalk cancellation modules may therefore be provided, for example, by a respective field-programmable gate array (FPGA) or application-specific integrated circuit (ASIC) in the transceiver itself.

Figure 5:
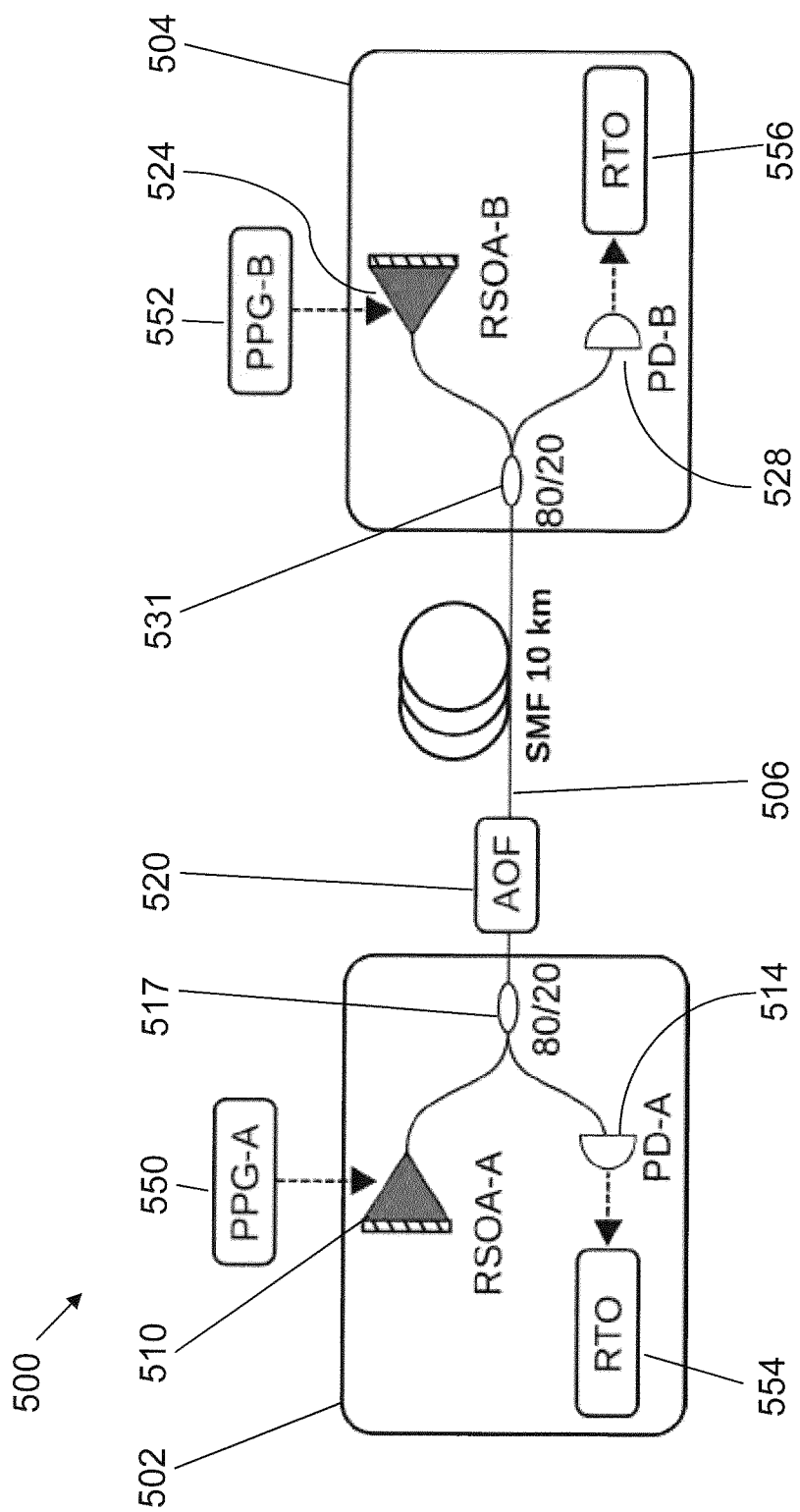
FIG. 5 schematically shows an experimental self-seeding configuration in accordance with a further embodiment.

FIG. 5 shows schematically an optical system 500 in accordance with a further embodiment. The optical system 500 was implemented for experimentally characterizing the optical systems described herein. In optical system 500, the first transceiver 502 includes a first RSOA 510 which is modulated by a first pulse pattern generator 550. The first photodiode 514 is connected to a first real-time oscilloscope 554. The second transceiver 504 includes a second RSOA 524 which is modulated by a second pulse pattern generator 552. The second photodiode 528 is connected to a second real-time oscilloscope 556. The first and second power splitters 517,531 are configured with an $\alpha:(1-\alpha)$ ratio of 20:80. The first and second transceivers 502,504 are optically coupled by a single mode optical fiber 506 of 10 km length. The optical system 500 can therefore be considered to represent a short-reach system. An arbitrary programmable optical filter 520 is provided between the first transceiver 502 and the optical fiber 506 for spectrally slicing the broadband ASE signals generated by the first and second RSOAs 510,524.

The first and second RSOAs 510,524 were identical and operated at around 20° C., with a bias between 70 and 85 mA (depending on the optical filter parameters). The first and second RSOAs 510,524 were operated with a nominal, small signal gain of 20 dB, an output saturation power of 5 dBm, and a modulation bandwidth of 900 MHz. The RSOAs 510,524 were directly driven by pseudorandom sequences of different length; in particular, by the two, uncorrelated pulse pattern generators 550,552, using pseudo-random bit sequences (PRBS) of different lengths ($2^{31}-1$ and $2^7-1$), so that the two counter-propagating flows were fully uncorrelated. For the purpose of the experimental characterization, a single optical filter 520, rather than two, was employed. This is in view of the large losses introduced by the specific programmable optical filter used, having about 7.5 dB insertion loss in both directions, which is almost equivalent to the losses introduced by a pair of WDM multiplexers, of around 3.5 dB each. The filter 520 was programmed to a Gaussian shape, with bandwidth variable from 50 to 300 GHz. The filter 520 was used to control three main system parameters: the cavity losses, the filter bandwidth, and the cavity dispersion.

As noted, the transmission link was realized by a 10 km long single mode fiber (SMF) 506. The round-trip cavity losses included a fixed value measured of 27 dB (doubling the single-pass loss of 3 dB in the 10 km fiber 506, 7.5 dB for the optical filter 520, 1 dB for each optical splitter 517,531, plus the connectors), plus a variable amount added by the programmable filter.

The transmitted signals were analyzed by real-time oscilloscopes (RTO) 554,556. Bit error ratio (BER) measurements were performed by a custom script running on the relevant RTO, the script first applying the feedback, or crosstalk, cancellation described above and then comparing bit-by-bit the received and the transmitted symbols. That is, the crosstalk cancellation and the consequent BER measurement were performed off-line after digitizing the received signal in the RTO. Due to the slow computing time, the BER measurements were limited to a level of $1 \times 10^{-8}$, which is far below the typical threshold forward error correction (FEC) values. For system characterization purposes, a non-return-to-zero (NRZ) signal at 1.25 Gb/s was used, which is compatible with the bandwidth of the RSOAs employed. However, the system operation may be extended to higher signal rates, for example, for application in 5G scenarios. It is expected that, by using RSOAs of higher modulation bandwidth, 10 Gb/s operations aided by FEC will be feasible.

Figure 6:
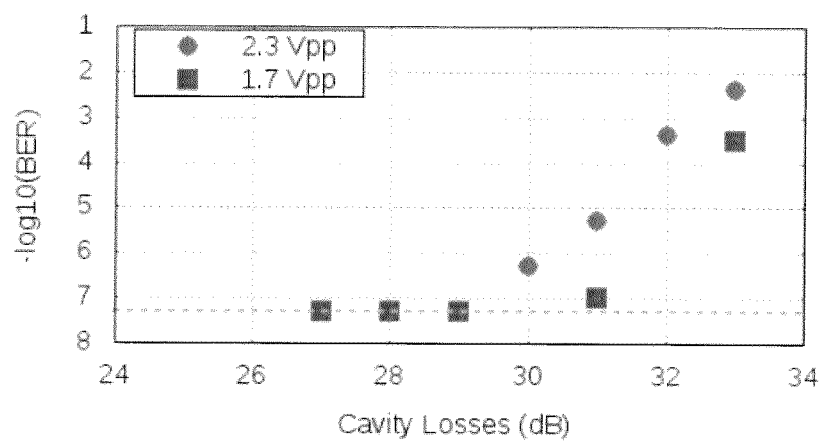
FIG. 6 shows a plot of bit error rate against cavity losses at different driving voltages of the reflective semiconductor optical amplifiers with the configuration of FIG. 5.

FIG. 6 shows the BER performance at 1.25 Gb/s as a function of the cavity losses at different driving voltages of the RSOAs 510,524, the voltages being 2.3 Vpp and 1.7 Vpp. As can be seen, in the measurement range, the BER increases by almost two orders per dB of increased cavity losses. There is also noted a marked performance dependency on the modulation depth. As expected, the crosstalk cancellation becomes more efficient when the transmitted signal has a small modulation depth (of about 2 dB), which corresponds to a driving voltage of 1.7 Vpp. It is noted that BER $<10^{-7}$ are not displayed due to the limited acquisition memory of the off-line processing toolbox used.

Figure 7:
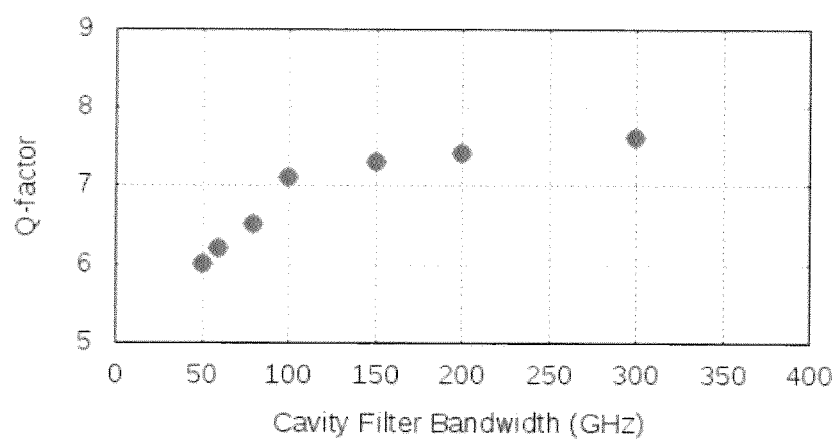
FIG. 7 shows a plot of system performance, Q-factor, against cavity filter bandwidth with the configuration of FIG. 5.

The system performance was also tested by changing the cavity filter bandwidth; in particular, as a function of the optical filter full width at half maximum (FWHM) bandwidth. In this case, the signal Q-factor was measured, which allowed much faster measurements. FIG. 7 shows the Q-factor as a function of the cavity filter bandwidth. As can be seen, the system performance improves by using an optical filter of wider bandwidth, as would be expected. This feature is typical of self-seeded transmitters and can be conveniently used in reconfigurable optical networks.

It can also be noted from FIG. 7 that the system is relatively resilient to changes in the filter bandwidth; indeed, the Q-factor is always greater than 6. Experiments indicate that common filter bandwidths are compatible with the optical systems described herein. Of course, it should be noted that such a measurement is indicative, as the performance depends on the characteristics of the RSOAs employed.

Figure 8:
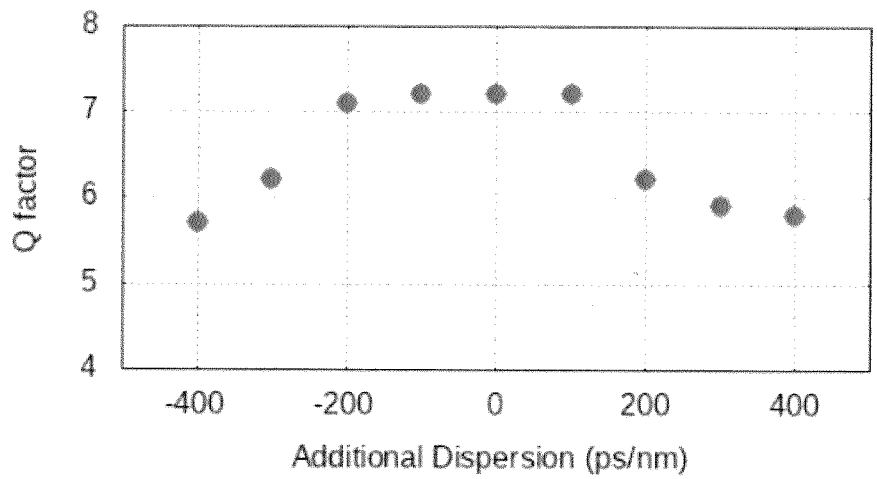
FIG. 8 shows a plot of system performance, Q-factor, against additional cavity dispersion with the configuration of FIG. 5.

The last parameter analyzed in the experimental characterization was the cavity dispersion. This was controlled by the optical programmable filter 520. FIG. 8 shows the Q-factor as a function of additional cavity dispersion added by the optical programmable filter 520. The system performance is found to be largely tolerant to the total cavity dispersion. In particular, it is apparent from FIG. 8 that the best performance may be obtained when the filter 520 does not introduce any dispersion compensation (i.e., it has a flat phase response).

The optical systems described herein may be applied in a variety of telecommunication network topologies. Such network topologies may be newly built using the optical systems, or the optical systems may be introduced into existing networks having one or more of the described network topologies. Exemplary network topologies include tree-and-branch, series, ring, and/or mesh network topologies. These topologies can be used in metro networks which are used to carry traffic across a wide geographical area, although embodiments are not limited to metro networks.

Figure 9:
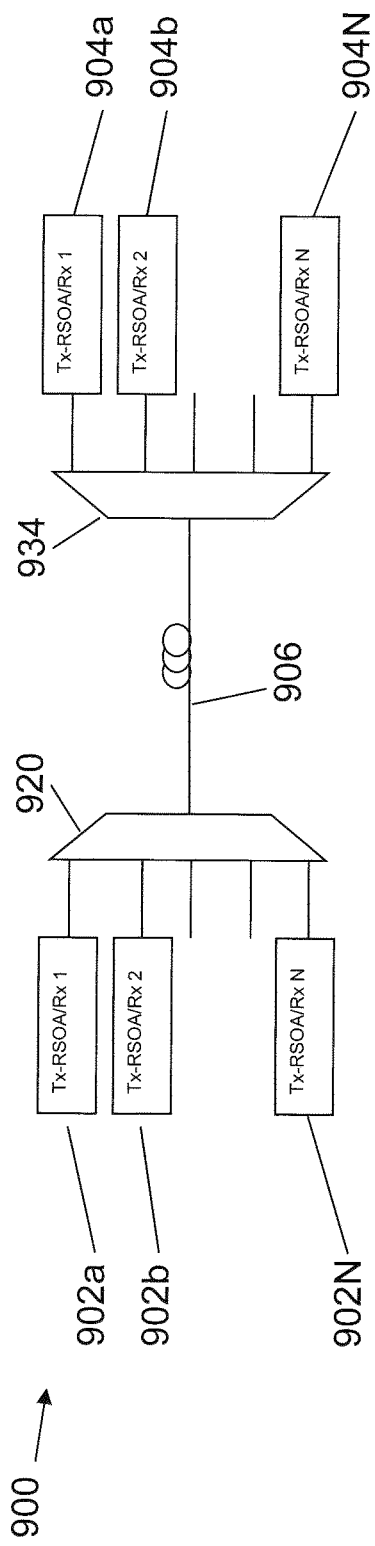
FIG. 9 schematically shows a tree-and-branch network topology in accordance with a further embodiment.

FIG. 9 shows schematically a tree-and-branch network 900 in which the optical systems described herein may be employed. The network 900 may be used, for example, to couple optical network units (ONUs) to an optical line terminal (OLT) in a passive optical network (PON), especially a WDM-PON. A plurality of first transceivers 902a-902N are coupled via a first WDM multiplexer 920 to an optical fiber communication link 906. A plurality of second transceivers 904a-904N are coupled via a second WDM multiplexer 934 to the optical fiber link 906. In this way, the optical system may provide a plurality of respective first and second transceiver pairs 902a-904a,902b-904b, . . . , 902N-904N configured for optical communication on respective wavelength channels over the optical communication link 906. The first WDM multiplexer 920 is configured for routing respective wavelength channels between the first transceivers 902 and the optical communication link 906. The second WDM multiplexer 934 is configured for routing the respective wavelength channels between the second transceivers 904 and the optical communication link 906.

Figure 10:
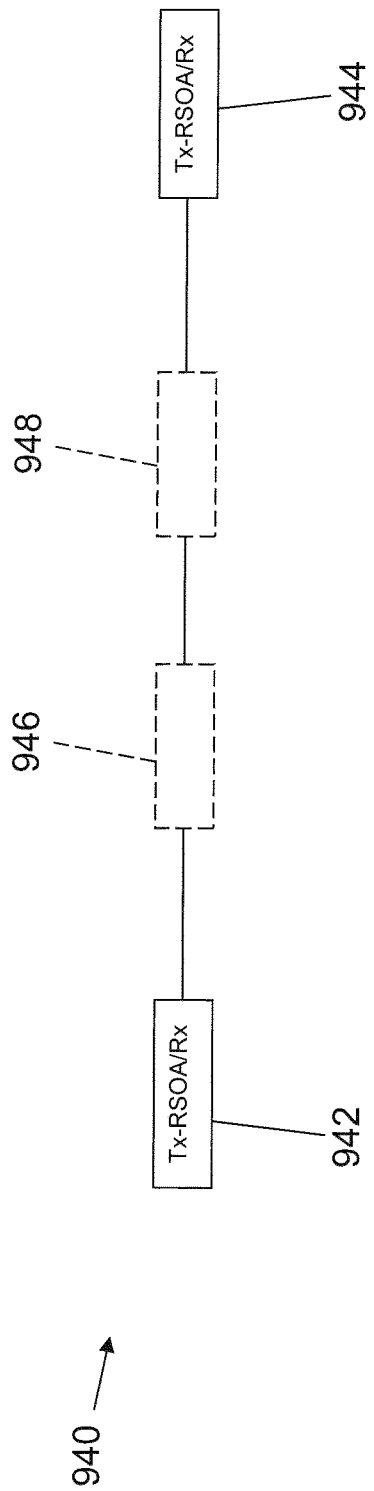
FIG. 10 schematically shows a series network topology in accordance with a further embodiment.

FIG. 10 shows schematically a series, or bus, network 940 in which the optical systems described herein may be employed. Here, a bus of first and second OADMs 946,948 is provided and first and second transceivers 942,944 are coupled to the first and second OADMS 946,948 respectively. The OADMs 946,948 are shown in dashed lines as there may be a series of several OADMs provided and other optical elements, for example further transceivers, may be coupled to them.

Figure 11:
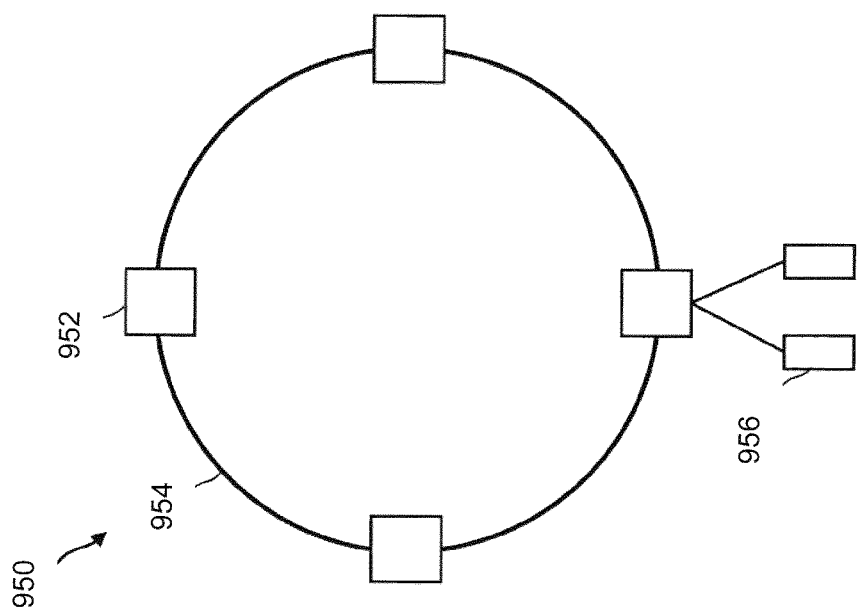
FIG. 11 schematically shows a ring network topology in accordance with a further embodiment.

FIG. 11 shows schematically a ring network 950 in which the optical systems described herein may be employed. The ring network 950 may, for example, be implemented with a ring of ROADMs. A set of nodes 952 are joined by optical links 954. The ring can be uni-directional or bi-directional. In a uni-directional ring, links 954 carry traffic in one direction, e.g. clockwise, around the ring between nodes 952. In a bi-directional ring, traffic can travel in either direction around the ring. In the ring network 950, one or more terminals 956 can connect to nodes 952 of the ring. Nodes 952 can also connect to other traffic sources/destinations, such as other networks. In this example, some of the terminals 956 may include first and second transceivers as described herein, the transceivers being separated by one or more links 954 of the ring.

Figure 12:
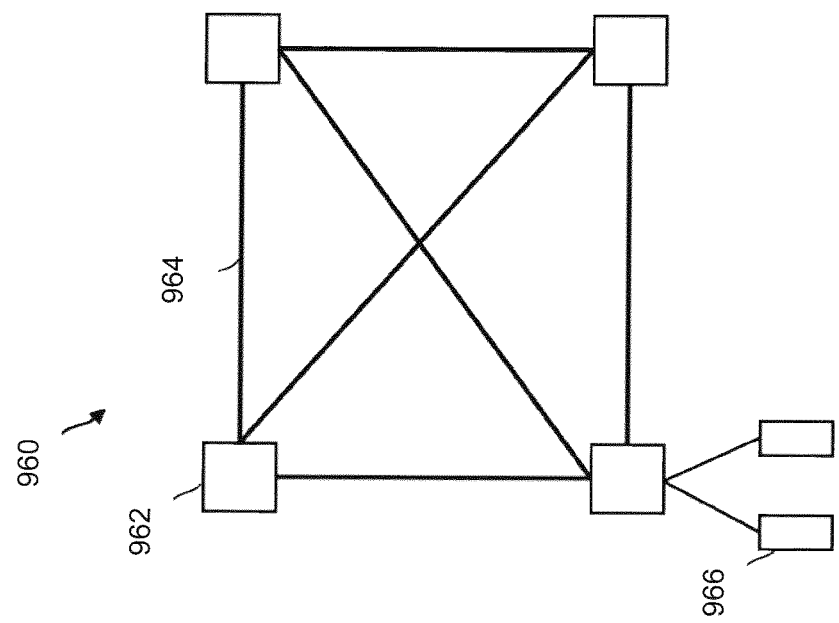
FIG. 12 schematically shows a mesh network topology in accordance with a further embodiment.

FIG. 12 shows schematically a mesh network 960 in which the optical systems described herein may be employed. The mesh network 960 may, for example, be implemented with a mesh of ROADMs. A set of nodes 962 are joined by optical links 964 which form a mesh of paths between nodes 962. Typically, traffic can flow in forward and reverse directions between each pair of nodes 962. In the mesh network 960, one or more terminals 966 can connect to nodes 962 of the mesh. Nodes 962 can also connect to other traffic sources/destinations, such as other networks. In this example, some of the terminals 966 may include first and second transceivers as described herein, the transceivers being separated by one or more links 964 of the mesh.

A network may comprise a hybrid combination of one or more tree-and-branch, series, ring, and/or mesh network topologies, or some other topology.

An optical terminal 956,966 may include an optical network terminal (ONT), an optical network unit (ONU), or tail end equipment (TEE). An optical terminal 956,966 may also be provided at a central office, and may be called an optical line terminal (OLT), or head end equipment (HEE). The optical terminals may also take other forms.

There are several different types of OADM. In broad terms, OADMs can be fixed or reconfigurable. A reconfigurable OADM has the possibility to change the set of wavelengths that can be added or dropped at the node.

It can be seen with the embodiments of FIGS. 2, 4, and 9 to 12 that each wavelength channel between a respective first reflective optical amplifier of a first optical transmitter and a respective second reflective optical amplifier of a second optical transmitter provides a respective optical cavity for seeding the first and second reflective optical amplifiers of the respective transceiver pair.

FIG. 13 shows a method 10 of seeding a first optical transmitter in accordance with one embodiment. At step 12, the method includes seeding a first optical transmitter in an optical system by using a second optical transmitter to provide a first optical seed signal for the first optical transmitter. The first optical transmitter comprises a first reflective optical amplifier and the second optical transmitter comprises a second reflective optical amplifier. At step 14, the method includes providing the first optical seed signal at the second optical transmitter by reflecting, by the second reflective optical amplifier, at least a portion of a first optical signal received from the first optical transmitter.

It will be understood that the optical systems and methods described herein offer a new self-seeding topology, which does not require partial reflectors installed in the network. This can be viewed as shifting the reflector from the WDM filter in a distribution node of the network (such as an OADM or AWG) to the transceiver at an optical link end. This offers the advantage of full compatibility with installed "regular" WDM networks, regardless of their topology (tree-and-branch, bus of OADMs, or rings with ROADMs). This arrangement provides a new lasing cavity, which includes the whole fiber link and not only the add/drop fibers. The cavity may therefore increase in length from a few hundreds of meters to a few kilometers.

The optical systems and methods described herein offer a number of advantages. The optical systems and methods may be implemented with commercially available and qualified (i.e., meeting technical specifications for implementation) optical components, such as AWGs and ROADMs, without requiring custom-developed parts. Without the need for partially reflective devices in the network, one barrier to an extended use of photonic integrated devices in the network (e.g. silicon photonics ROADMs) is removed. The optical systems and methods are compatible with all the network topologies usually considered in (D)WDM networks (such as tree, bus, mesh, and/or ring), and this may be based on fixed or dynamically assigned wavelengths. The self-seeding acts on individual channels rather than the whole (D)WDM spectrum, allowing the coexistence of multiple transmission techniques (such as fixed lasers, tunable lasers, self-seeding devices) and bit-rates. This may allow for a 'pay-as-you-grow' network-upgrade policy, and may help achieve the best trade-off between performance and cost.

In one embodiment of an optical system, there may be provided a single-fiber, bi-directional, wavelength division multiplexed channel where the transceivers at both the ends have at least one reflective device and one gain block capable of working for all the channels of the DWDM spectrum. With a wavelength-selective element placed in the link, the transceivers are able to exchange data at that selected wavelength. The data may be exchanged with a given bit error rate performance.

The optical systems and methods described herein may support the dynamic creation of optical paths at given wavelengths. The optical systems and methods may therefore be employed in dynamically reconfigured networks based on ROADMs.

The transceivers may also offer the capability to cancel out the crosstalk affecting the received data by the reflected transmitted data in the opposite direction. This may be provided by a local feedforward control.

The optical systems and methods described herein provide configurations in which the optical cavity extends through the whole optical link, rather than being limited to the remote node as in the conventional configurations. This configuration is advantageous since it reduces the number of optical components needed, while allowing for shorter reaches, making it suitable for application in the front-haul domain or data-center networks.

The optical systems and methods described herein provide configurations in which the reflector is removed from the remote node and is effectively implemented by another RSOA at the opposite link end. The new cavity may provide two RSOAs which can be simultaneously modulated. This also allows for bi-directional transmission on the resonant wavelength, while the traditional scheme typically used different wavelength bands (i.e. C/L bands) for bi-directional communication. This modification reduces the number of optical components and consequently costs. The optical systems and methods described herein can support new application scenarios for self-seeded transmitters, where the self-seeding cavity comprises the whole optical link, end-to-end. This feature can become relevant in reconfigurable networks, allowing the creation of dynamic, software-defined light-paths.

Other variations, modifications, and embodiments will be apparent to the skilled person and are intended to form part of the disclosure.

The invention claimed is:

1. An optical system for seeding an optical transmitter, the system comprising:
   a first optical transmitter comprising a first reflective optical amplifier;
   a second optical transmitter comprising a second reflective optical amplifier, the second optical transmitter being optically coupled to the first optical transmitter; and
   an optical cavity for seeding the first reflective optical amplifier with a first optical seed signal, wherein the optical cavity is formed between the first reflective optical amplifier of the first optical transmitter and the second reflective optical amplifier of the second optical transmitter,
   wherein the first reflective optical amplifier is configured to transmit a first optical signal to the second reflective optical amplifier and the second reflective optical amplifier is configured to provide the first optical seed signal by reflecting a portion of the first optical signal back to the first reflective optical amplifier, wherein the optical system further comprising a first optical transceiver, the first optical transceiver comprising the first optical transmitter and a first optical receiver, wherein the first and second optical transmitters are configured to transmit a respective first and second modulated optical signal, wherein the first optical receiver is configured to receive a first receiver optical signal, the first receiver optical signal comprising the second modulated optical signal from the second optical transmitter and a reflected first modulated optical signal from the first optical transmitter, the first optical transceiver further comprising a first crosstalk cancellation module for removing the reflected first modulated optical signal from the first receiver optical signal.

2. The optical system of claim 1, wherein the first optical seed signal comprises a first wavelength and the first reflective optical amplifier is configured to transmit the first optical signal at the first wavelength in response to the first optical seed signal; wherein the optical system further comprising a first wavelength-selective filter optically coupled between the first and second optical transmitters for selectively passing the first wavelength; and wherein the first wavelength-selective filter comprises first wavelength-division multiplexing filters.

3. The optical system of claim 2, wherein the optical cavity is further configured for seeding the second reflective optical amplifier with a second optical seed signal, wherein the second reflective optical amplifier is configured to transmit a second optical signal to the first reflective optical amplifier and the first reflective optical amplifier is configured to provide the second optical seed signal by reflecting a portion of the second optical signal back to the second reflective optical amplifier; wherein the second optical seed signal comprises the first wavelength and the second reflective optical amplifier is configured to transmit the second optical signal at the first wavelength in response to the second optical seed signal; and wherein the optical system further comprising a second wavelength-selective filter optically coupled between the first and second optical transmitters for selectively passing the first wavelength; wherein the second wavelength-selective filter comprises second wavelength-division multiplexing filters.

4. The optical system of claim 1, wherein the first and second optical transmitters are optically coupled by an optical communication link and the optical cavity comprises the first reflective optical amplifier of the first optical transmitter, the optical communication link, and the second reflective optical amplifier of the second optical transmitter.

5. The optical system of claim 1, wherein the first crosstalk cancellation module is configured to remove the reflected first modulated optical signal from the first receiver optical signal based on the first modulated optical signal transmitted by the first optical transmitter and a first delay time for the first modulated optical signal to be transmitted from the first optical transmitter to the second reflective optical amplifier and back to the first optical receiver.

6. The optical system of claim 1, further comprising a second optical transceiver, the second optical transceiver comprising the second optical transmitter and a second optical receiver, wherein the second optical receiver is configured to receive a second receiver optical signal, the second receiver optical signal comprising the first modulated optical signal from the first optical transmitter and a reflected second modulated optical signal from the second optical transmitter, the second optical transceiver further comprising a second crosstalk cancellation module for removing the reflected second modulated optical signal from the second receiver optical signal.

7. The optical system of claim 6, wherein the second crosstalk cancellation module is configured to remove the reflected second modulated optical signal from the second receiver optical signal based on the second modulated optical signal transmitted by the second optical transmitter and a second delay time for the second modulated optical signal to be transmitted from the second optical transmitter to the first reflective optical amplifier and back to the second optical receiver.

8. The optical system of claim 1, further comprising an optical network, wherein the optical network comprises one or more of a mesh network, a ring network, a series network, and/or a tree-and-branch network.

9. A method of seeding a first optical transmitter in an optical system by using a second optical transmitter to provide a first optical seed signal for the first optical transmitter, wherein the first optical transmitter comprises a first reflective optical amplifier and the second optical transmitter comprises a second reflective optical amplifier, and the first optical seed signal is provided at the second optical transmitter by reflecting, by the second reflective optical amplifier, at least a portion of a first optical signal received from the first optical transmitter, wherein the optical system comprises a first optical transceiver, the first optical transceiver comprising the first optical transmitter and a first optical receiver, the method further comprising:

the first and second optical transmitters transmitting a respective first and second modulated optical signal, the first optical receiver receiving a first receiver optical signal, the first receiver optical signal comprising the second modulated optical signal from the second optical transmitter and a reflected first modulated optical signal from the first optical transmitter, the first optical transceiver removing the reflected first modulated optical signal from the first receiver optical signal.

10. The method of claim 9, wherein the first optical seed signal comprises a first wavelength and the first reflective optical amplifier transmits the first optical signal at the first wavelength in response to the first optical seed signal; wherein the method further comprising filtering the first optical signal between the first and second optical transmitters to selectively pass the first wavelength; and wherein the filtering comprises wavelength-division multiplexing filtering a first and second optical signals.

11. The method of claim 9, further comprising seeding the second optical transmitter by using the first optical transmitter to provide a second optical seed signal for the second optical transmitter, wherein the second optical seed signal is provided at the first optical transmitter by reflecting, by the first reflective optical amplifier, at least a portion of a second optical signal received from the second optical transmitter.

12. The method of claim 11, wherein the second optical seed signal comprises a first wavelength and the second reflective optical amplifier transmits the second optical signal at the first wavelength in response to the second optical seed signal; wherein the method further comprising filtering the second optical signal between the first and second optical transmitters to selectively pass the first wavelength; and wherein the first and second optical transmitters are optically coupled by an optical communication link and an optical seed cavity is formed by the first reflective optical amplifier of the first optical transmitter, the optical communication link, and the second reflective optical amplifier of the second optical transmitter.

13. The method of claim 9, wherein the reflected first modulated optical signal is removed from the first receiver optical signal based on the first modulated optical signal transmitted by the first optical transmitter and a first delay time for the first modulated optical signal to be transmitted from the first optical transmitter to the second reflective optical amplifier and back to the first optical receiver.

14. The method of claim 9, wherein the optical system further comprises a second optical transceiver, the second optical transceiver comprising the second optical transmitter and a second optical receiver, the method further comprising:
  the second optical receiver receiving a second receiver optical signal, the second receiver optical signal comprising the first modulated optical signal from the first optical transmitter and a reflected second modulated optical signal from the second optical transmitter,
  the second optical transceiver removing the reflected second modulated optical signal from the second receiver optical signal.

15. The method of claim 14, wherein the reflected second modulated optical signal is removed from the second receiver optical signal based on the second modulated optical signal transmitted by the second optical transmitter and a second delay time for the second modulated optical signal to be transmitted from the second optical transmitter to the first reflective optical amplifier and back to the second optical receiver.

16. An optical system comprising:
  a first optical transceiver comprising:
    a first optical transmitter comprising a first reflective optical amplifier; and
    a first optical receiver;
  a second optical transceiver comprising:
    a second optical transmitter comprising a second reflective optical amplifier;
    and a second optical receiver; and
  an optical communication link optically coupled between the first and second optical transceivers;
  wherein the first optical transmitter is configured to transmit a first optical signal to the second optical receiver, and the second optical transmitter is configured to transmit a second optical signal to the first optical receiver,
  wherein the second reflective optical amplifier of the second optical transmitter is configured to receive a portion of the first optical signal and to reflect the portion of the first optical signal back to the first reflective optical amplifier as a first optical seed signal for the first reflective optical amplifier, and
  wherein the first reflective optical amplifier of the first optical transmitter is configured to receive a portion of the second optical signal and to reflect the portion of the second optical signal back to the second reflective optical amplifier as a second optical seed signal for the second reflective optical amplifier,
  wherein the first and second optical transmitters are configured to transmit a respective first and second modulated optical signal,
  wherein the first optical receiver is configured to receive a first receiver optical signal, the first receiver optical signal comprising the second modulated optical signal from the second optical transmitter and a reflected first modulated optical signal from the first optical transmitter,
  the first optical transceiver further comprising a first crosstalk cancellation module for removing the reflected first modulated optical signal from the first receiver optical signal.

17. The optical system of claim 16, further comprising:
  a plurality of respective first and second transceiver pair configured for optical communication on respective wavelength channels over the optical communication link;
  a first wavelength router optically coupled between the first transceivers and the optical communication link for routing respective wavelength channels between the first transceivers and the optical communication link; and
  a second wavelength router optically coupled between the second transceivers and the optical communication link for routing the respective wavelength channels between the second transceivers and the optical communication link.

18. The optical system of claim 17, wherein each wavelength channel between a respective first reflective optical amplifier of a first optical transmitter and a respective second reflective optical amplifier of a second optical transmitter provides a respective optical cavity for seeding the first and second reflective optical amplifiers of the respective transceiver pair.

* * * * *